March 10, 1964  C. W. PETERSON  3,124,769
HIGH ELONGATION STRAIN GAGE
Filed Sept. 26, 1961

INVENTOR.
Charles W. Peterson
BY
Attorney

United States Patent Office 3,124,769
Patented Mar. 10, 1964

3,124,769
HIGH ELONGATION STRAIN GAGE
Charles W. Peterson, Brighton, Mass., assignor to Baldwin-Lima-Hamilton Corporation, a corporation of Pennsylvania
Filed Sept. 26, 1961, Ser. No. 140,785
6 Claims. (Cl. 338—2)

This invention relates to high elongation strain gages and particularly to those of the electrical strain sensitive filament type.

Many attempts have been made to provide high elongation strain-measuring devices such as elastic tubes filled with mercury, mechanical and optical strain gages, etc., but these have been deficient either structurally or functionally, or they have been extremely expensive. While electrical-resistance strain gages especially of the bonded filament type have many well-known advantages over the various types of devices mentioned above, they have heretofore had the disadvantage of limited elongation.

It is an object of my invention to provide an improved electrical strain sensitive gage that is capable of extremely high elongation.

Another object is to provide an improved bonded electrical resistance filament type strain gage of high elongation qualities that is relatively simple in construction and operation and is economical in manufacture, combined with ease of application.

Other objects and advantages will be more apparent to those skilled in the art from the description of the accompanying drawings in which.

Figure 1:
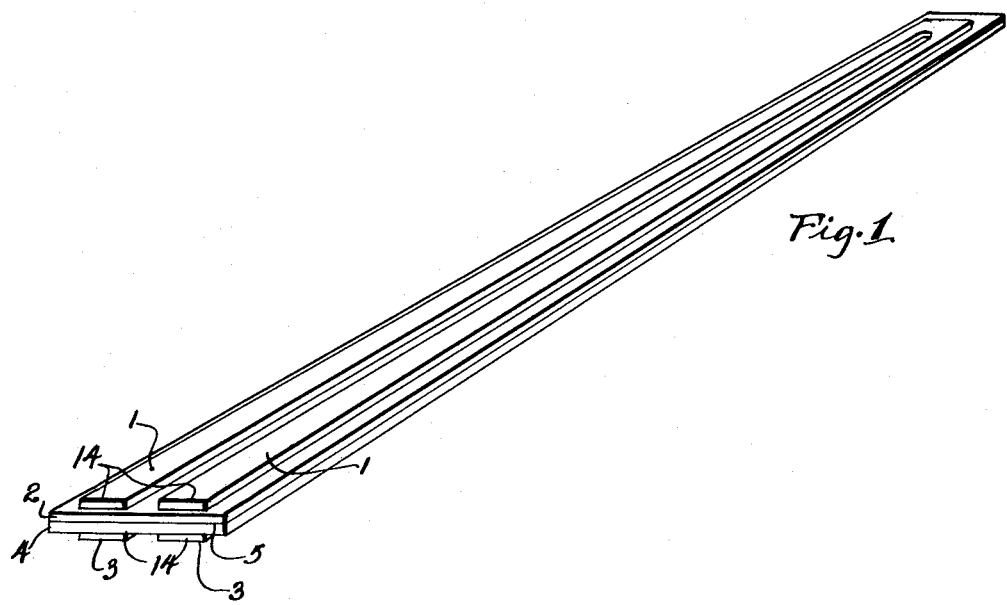
FIG. 1 is a perspective of the gage filaments and carrier membrane prior to its final gage form.

In the particular embodiment of the invention disclosed herein for purposes of illustration I provide a gage filament 1 preferably of U-shape and bonded throughout its length to a carrier membrane 2 such as Bakelite or any other well-known electrical insulating material such as is used in bonded filament-type strain gages. The carrier or backing membrane 2 has top and bottom sides and two edges and is of such thickness as to provide a suitable flexible support for the gage filament 1. The material of this electrical strain-sensitive filament may be of any suitable form such as wire or foil, but is preferable of the well-known etched foil type whereby the U-shaped filament is etched from a sheet and the gage is then transferred to one of the side surfaces of membrane 2 and bonded thereto. It is preferable to provide a duplicate gage and for this purpose a second U-shaped foil filament 3 is bonded to a second carrier 4, these being substantially identical in every respect to the elements 1 and 2. The two carrier membranes 2 and 4 are then placed back to back with the filaments in substantially superimposed relations, i.e. in transverse alignment, and the backs are then cemented together along the junction line 5 to constitute broadly a single membrane. The technique for forming etched foil gages is well-known and hence need not be described further. In my particular invention the carrier membranes are only partially cured as in the case when Bakelite is used.

Figure 2:
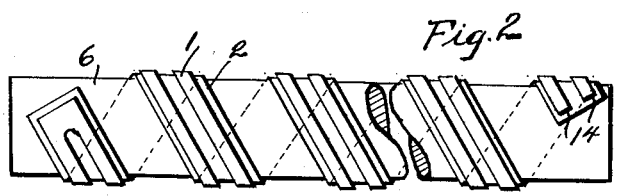
FIG. 2 is an elevational view showing one step in the manufacture of the final form of the gage.
Figure 3:
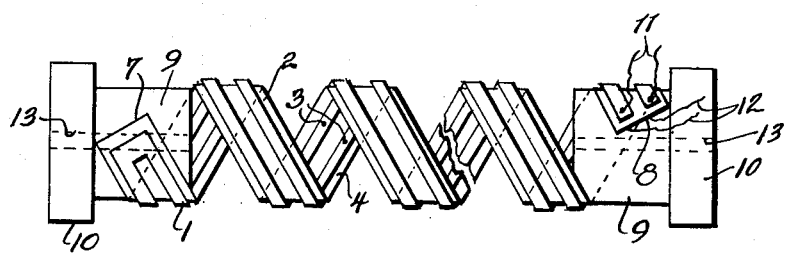
FIG. 3 is an elevational view of the gage in its final form.

The partially cured membranes when cemented together as shown in FIG. 1 are now wrapped in helical form on a mandrel 6, FIG. 2 and the curing is then completed with the result that when removed from the mandrel the gage will retain a permanent helical formation as shown in FIG. 3. The membrane in its free state is thus self-supporting even though the edges of the successive membrane helical coils are freely spread apart along the axis of the helix. The gage is then completed by securing the ends 7 and 8 to cylindrical hubs 9 provided with flanges 10, which serve to anchor the gage to or within a structure under test. Such a structure may be concrete, solid propellant fuels, etc. The ends 14 of the parallel legs of the U-shaped gage filaments terminate at a common end of the membrane so that usual leads 11 and 12 may be conveniently connected to the filaments 1 and 3 respectively. A change in electrical resistance of the gage filaments may be measured in well-known bridge circuits as the gage is stretched or compressed. Axial holes 13 in each end piece 9, 10 are coaxial with the helix axis thereby permitting a single rod (not shown) to extend through the entire gage from one hole to the other so as to keep the gage in its axial alignment during installation.

In operation, the helical form of the gage permits it to have an extraordinary degree of elongation with no danger of rupturing the gage and this change in elongation will cause a change in the electrical resistance of the gage filaments. Thus, it is seen that I have provided an extremely simple and highly-effective high elongation gage that has all the desirable qualities of the bonded filament type gage. If desired, the gage may be bonded directly to the mandrel 6 by being suitably insulated therefrom so that axial loads acting on the mandrel will cause change in resistance in the helical filaments. Thus, the mandrel 6 may be either in the nature of a dynamometer bar or a test specimen. The material of such a mandrel would ordinarily be highly elastic to obtain the full benefits of my improved electrical gage although the gage would be equally applicable to more rigid materials.

It will of course be understood that various changes in details of construction and arrangement of parts may be made by those skilled in the art without departing from the spirit of the invention as set forth in the appended claims.

I claim:

1. A strain gage comprising, in combination, an elongated carrier membrane of electrical insulating material having top and bottom sides and two edges, an electrical strain sensitive filament bonded to one of said sides of the membrane so as to be supported thereby and extending in the direction of the elongated axis thereof, the membrane and filament being helically curved about an axis so that said gages of the successive helical coils are freely spaced apart along said axis whereby the gage may have a relatively large elongation along said axis of the helix for a given change in electrical resistance of the gage filament.

2. The combination set forth in claim 1 further characterized in that the gage filament is U-shaped and disposed entirely on one said side of the membrane with the ends of the filament extending toward the same end of the membrane.

3. The combination set forth in claim 1 further characterized in that a second gage filament is disposed on the other side of the membrane.

4. The combination set forth in claim 1 further characterized in that the gage is duplicated and the membranes of the two gages are bonded together so that one filament substantially overlies the other.

5. The combination set forth in claim 1 further characterized in that the gage filament is of U-shaped with the open end thereof terminating at one end of the carrier membrane, and a second filament and membrane similar to the others, the two membranes having their backs secured together.

6. The combination set forth in claim 1 further characterized in that the gage filament is of U-shape with the open end thereof terminating at one end of the carrier membrane, and a second filament and membrane similar to the others, the two membranes having their backs secured together so that the gage filaments are in substantially superimposed relation, and the open ends of both U-shaped filaments terminating at said one end.

References Cited in the file of this patent

UNITED STATES PATENTS

| | | |
|---|---|---|
| 2,392,293 | Ruge | Jan. 1, 1946 |
| 2,457,616 | Van Dyke | Dec. 28, 1948 |
| 2,467,752 | Howe | Apr. 19, 1949 |
| 2,873,341 | Kutsay | Feb. 10, 1949 |
| 2,883,503 | Osgood | Apr. 21, 1959 |
| 2,935,709 | Paine | May 3, 1960 |